United States Patent
Lin et al.

(10) Patent No.: US 9,313,148 B2
(45) Date of Patent: Apr. 12, 2016

(54) OUTPUT QUEUE OF MULTI-PLANE NETWORK DEVICE AND RELATED METHOD OF MANAGING OUTPUT QUEUE HAVING MULTIPLE PACKET LINKED LISTS

(71) Applicant: MEDIATEK INC., Hsin-Chu (TW)

(72) Inventors: Li-Lien Lin, Hsinchu (TW); Ta Hsing Liu, Sunnyvale, CA (US); Jui-Tse Lin, Hsinchu County (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 81 days.

(21) Appl. No.: 14/252,789

(22) Filed: Apr. 15, 2014

(65) Prior Publication Data
US 2014/0321474 A1     Oct. 30, 2014

Related U.S. Application Data

(60) Provisional application No. 61/816,247, filed on Apr. 26, 2013, provisional application No. 61/910,967, filed on Dec. 3, 2013.

(51) Int. Cl.
| | | |
|---|---|---|
| *H04L 12/26* | (2006.01) | |
| *H04L 12/28* | (2006.01) | |
| *H04L 12/66* | (2006.01) | |
| *H04L 12/883* | (2013.01) | |

(52) U.S. Cl.
CPC .................................. *H04L 49/9015* (2013.01)

(58) Field of Classification Search
CPC ......... H04L 45/44; H04L 49/15; H04L 49/25; H04L 49/102; H04L 49/103; H04L 49/255; H04L 49/3081; H04L 49/9015; H04L 2012/5679; H04L 2012/5681; H04Q 2011/0064

USPC ................. 370/412–430, 229–240, 400–411, 370/461–463
See application file for complete search history.

(56) References Cited

U.S. PATENT DOCUMENTS

| | | | | |
|---|---|---|---|---|
| 7,236,489 B1 * | 6/2007 | Wyatt | .................... | H04L 49/103 370/392 |
| 8,804,709 B2 * | 8/2014 | Sindhu | .................... | H04L 49/45 370/235 |
| 8,861,300 B2 * | 10/2014 | Chin | .................... | G11C 7/1006 365/230.02 |

(Continued)

FOREIGN PATENT DOCUMENTS

| | | |
|---|---|---|
| CN | 102130833 A | 7/2011 |
| CN | 102480430 A | 5/2012 |
| WO | 2011015055 A1 | 2/2011 |

OTHER PUBLICATIONS

"International Search Report" mailed on Jul. 25, 2014 for International application No. PCT/CN2014/076021, International filing date:Apr. 23, 2014.

*Primary Examiner* — Tri H Phan
(74) *Attorney, Agent, or Firm* — Winston Hsu; Scott Margo

(57) ABSTRACT

An output queue of a multi-plane network device includes a first processing circuit, a plurality of storage devices and a second processing circuit. The first processing circuit generates packet selection information based on an arrival sequence of a plurality of packets. The storage devices store a plurality of packet linked lists for the output queue. The second processing circuit dequeues a packet from the output queue by selecting a linked list entry from the packet linked lists according to the packet selection information.

20 Claims, 4 Drawing Sheets

(56) References Cited

U.S. PATENT DOCUMENTS

| | | | | |
|---|---|---|---|---|
| 8,861,434 B2* | 10/2014 | Khawer | ................. | H04L 49/90 370/328 |
| 8,959,291 B2* | 2/2015 | Zhou | ........................ | G11C 8/16 711/149 |
| 9,019,832 B2* | 4/2015 | Lu | ........................... | H04L 47/12 370/235 |
| 2003/0147409 A1* | 8/2003 | Wolrich | .................. | H04L 49/90 370/412 |
| 2010/0329066 A1 | 12/2010 | Chin | | |
| 2011/0286463 A1* | 11/2011 | Tse | .................... | G06F 17/30958 370/400 |
| 2011/0302376 A1 | 12/2011 | Zhou | | |
| 2012/0134320 A1* | 5/2012 | Khawer | .................. | H04L 49/90 370/328 |

* cited by examiner

OUTPUT QUEUE OF MULTI-PLANE NETWORK DEVICE AND RELATED METHOD OF MANAGING OUTPUT QUEUE HAVING MULTIPLE PACKET LINKED LISTS

CROSS REFERENCE TO RELATED APPLICATIONS

This application claims the benefit of U.S. provisional application No. 61/816,247 (filed on Apr. 26, 2013) and U.S. provisional application No. 61/910,967 (filed on Dec. 3, 2013). The entire contents of the related applications are incorporated herein by reference.

BACKGROUND

The disclosed embodiments of the present invention relate to forwarding packets, and more particularly, to an output queue of a multi-plane network device and related method of managing the output queue having multiple packet linked lists.

A network switch is a computer networking device that links different electronic devices. For example, the network switch receives an incoming packet generated from a source electronic device connected to it, and transmits an outgoing packet derived from the received packet to one or more destination electronic devices for which the received packet is meant to be received. In general, the network switch has a packet buffer for buffering packet data of packets received from ingress ports, and forwards the packets stored in the packet buffer through egress ports.

Besides, when a packet is received from one of the ingress ports, the packet is further enqueued to one output queue. To relax the memory requirement of the output queue, a single linked list structure is employed to serve in one output queue. When the network switch has multiple planes, multiple packets may be enqueued into the same or different output queues in one clock cycle. Also, multiple packets may be dequeued from linked lists in one clock cycle. Since multiple enqueue and dequeue operations are required to be accomplished in one clock cycle, a multi-port memory is generally required to buffer the packet linked list. For example, considering a two-plane network switch, a 2R2W static random access memory (SRAM) is used to store the packet linked list for output queues. However, the 2R2W SRAM has large chip area and high cost. When the network switch has n planes (n>2), using nRnW SRAMs would not be a cost-efficient solution for the output queue design.

SUMMARY

In accordance with exemplary embodiments of the present invention, an output queue of a multi-plane network device that uses multiple packet linked lists and related method of managing the output queue having multiple packet linked lists are proposed to solve the above-mentioned problem.

According to a first aspect of the present invention, an exemplary output queue of a multi-plane network device is disclosed. The output queue includes a first processing circuit, a plurality of storage devices and a second processing circuit. The first processing circuit is arranged to generate packet selection information based on an arrival sequence of a plurality of packets. The storage devices are arranged to store a plurality of packet linked lists for the output queue. The second processing circuit is arranged to dequeue a packet from the output queue by selecting a linked list entry from the packet linked lists according to the packet selection information.

According to a second aspect of the present invention, an exemplary method for managing an output queue of a multi-plane network device is disclosed. The exemplary method includes: generating packet selection information based on an arrival sequence of a plurality of packets; utilizing a plurality of storage devices to store a plurality of packet linked lists for the output queue; and dequeuing a packet from the output queue by selecting a linked list entry from the packet linked lists according to the packet selection information.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The concept of the present invention is to use multiple packet linked lists to implement one output queue of a network device, where the output queue operates is one kind of data buffering circuits, and the packet linked lists correspond to different planes, respectively. Hence, packets received from one plane and required to be forwarded via the output queue are enqueued into one packet linked list. In this way, multiple packets can still be enqueued into the output queue at the same clock cycles even though each of the packet linked lists is maintained in a two-port memory (1R1W) that has one read port and one write port for addresses and controls to only allow two simultaneous access (one read and one write) at a time. Compared to one output queue having a single packet linked list implemented in a multi-port memory (nRnW), the proposed output queue using two-port memories (1R1W) has smaller chip size and lower cost. Further details of the proposed output queue used in a multi-plane network device (e.g., a network switch with more than one plane) are described as below.

Figure 1:
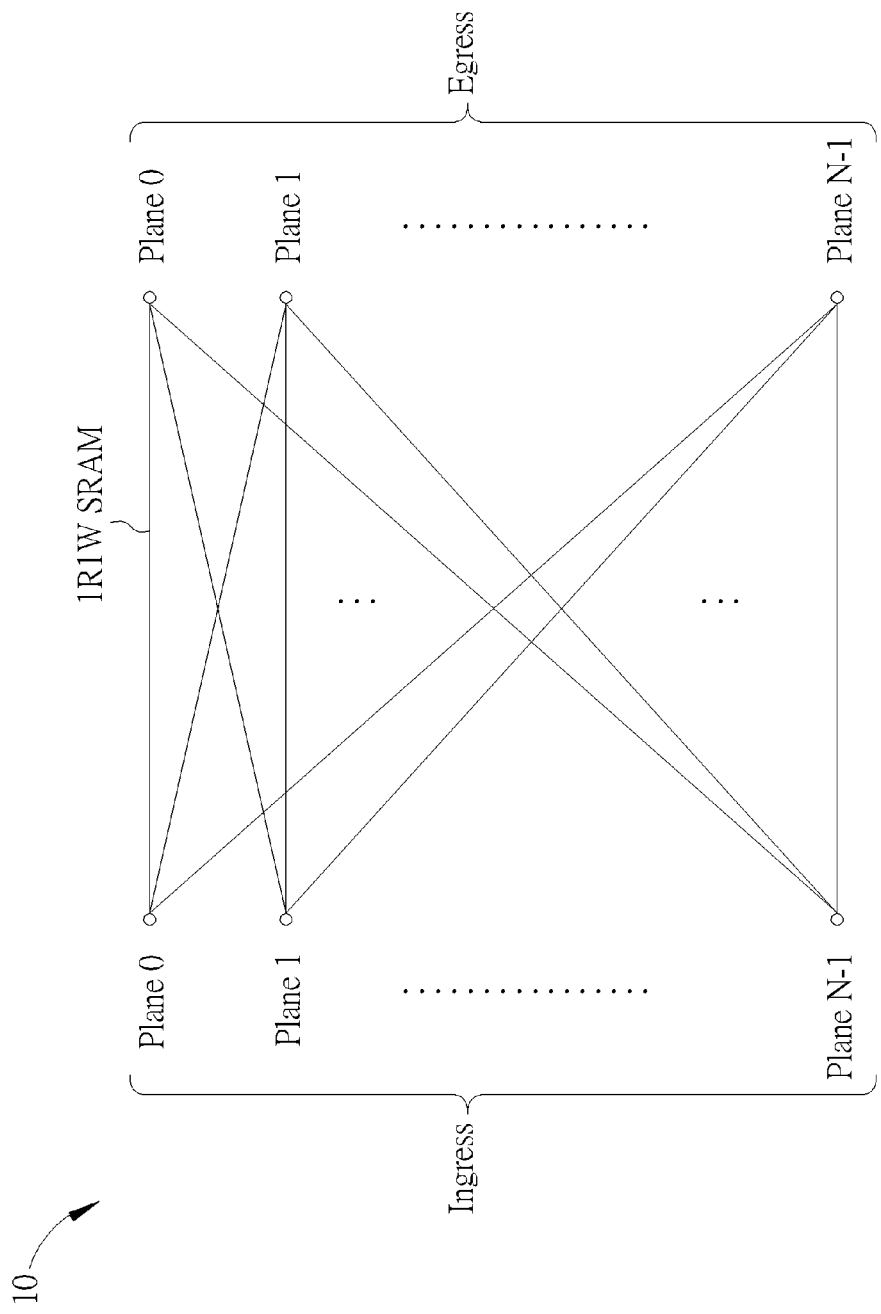
FIG. 1 is a diagram illustrating an exemplary output queue structure employed by a multi-plane network device according to the present invention.

FIG. 1 is a diagram illustrating an exemplary output queue structure employed by a multi-plane network device according to the present invention. Suppose that the multi-plane network device 10 has N planes, each including a plurality of ingress ports and a plurality of egress ports. In this embodiment, at most N packets from plane 0-plane N−1 can be enqueued into one output queue in the same clock cycle, where each output queue would have N packet linked lists maintained in N dual-port memories (e.g., 1R1W SRAMs). More specifically, one 1R1W SRAM is coupled between ingress ports of one of the N planes and egress ports of one of the N planes. Hence, the exemplary output queue structure has N×N full-entry 1R1W SRAMs. For example, regarding one of a plurality of output ports associated with the same egress port of one plane, one of the N packet linked lists for the output queue is stored in one 1R1W SRAMi, j located between $i^{th}$ plane (ingress) and the plane $j^{th}$ (egress), where i=0, 1, . . . , N−1 and j=0, 1, . . . , N−1. For better understanding of technical features of the present invention, the structure and operation of one output queue proposed by the present invention are detailed as below.

Figure 2:
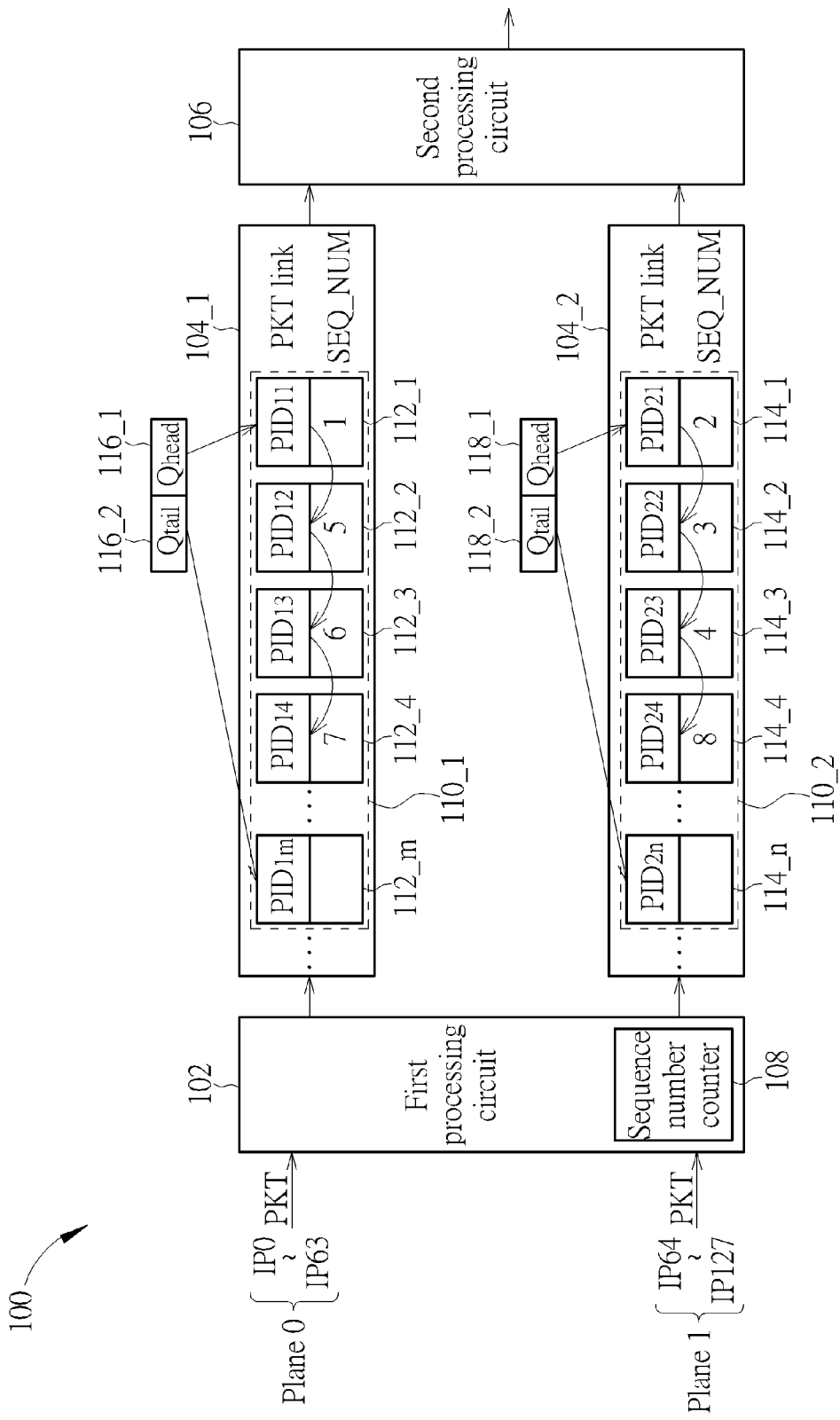
FIG. 2 is a diagram illustrating an output queue of a multi-plane network device according to a first embodiment of the present invention.

Please refer to FIG. 2, which is a diagram illustrating an output queue of a multi-plane network device according to a first embodiment of the present invention. The output queue 100 includes a first processing circuit 102 and a second processing circuit 106. Besides, the output queue 100 has a plurality of storage devices. For clarity and simplicity, the following assumes that the multi-plane network device is a two-plane network switch. Hence, two storage devices 104_1 and 104_2 are used in the output queue 100, where the storage devices 104_1 and 104_2 correspond to two planes, including plane 0 and plane 1, respectively.

The first processing circuit 102 is arranged to generate packet selection information based on an arrival sequence of a plurality of packets PKT, each coming from one of a plurality of planes (e.g., plane 0 and plane 1 in this example) and required to be forwarded via the same output queue 100. The first processing circuit 102 has a sequence number counter 108 configured to generate a sequence number SEQ_NUM for each of the packets PKT to be forwarded through the output queue 100. Hence, the packet selection information generated by the first processing circuit 102 would include sequence numbers of the packets PKT.

In this embodiment, since the multi-plane network device 100 has two planes, two storage devices 104_1 and 104_2 are arranged to store a plurality of packet linked lists 110_1 and 110_2 for the output queue 100, respectively. Each of the storage devices 104_1 and 104_2 allows a single enqueue operation in one clock cycle only. Thus, the storage devices 104_1 and 104_2 may be implemented using low-cost memory devices. For example, each of the storage devices 104_1, 104_2 is one full-entry 1R1W SRAM. Since the packet linked lists 104_1 and 104_2 correspond to different ingress planes (i.e., plane 0 with multiple ingress such as ports IP0-IP63 and plane 1 with multiple ingress ports such as IP64-IP127), respectively, a packet coming from a specific plane of the ingress planes and required to be forwarded via the output queue 100 is enqueued into a packet linked list corresponding to the specific plane. For example, when a first packet is enqueued into a packet linked list, a packet identifier PID representative of the first packet is stored in a first linked list entry; and when a second packet following the first packet is enqueued into the same packet linked list, a packet identifier PID representative of the second packet is stored in a second linked list entry, and the first linked list entry would further set a next packet identifier by the packet identifier PID of the second packet. Hence, after received packets are enqueued into the same packet linked list, the packet linked list would have several linked list entries. As shown in FIG. 2, the packet linked list 110_1 has a packet link formed by a plurality of linked list entries 112_1, 112_2, 112_3, 112_4, . . . 112_m; and the packet linked list 1102 has another packet link formed by a plurality of linked list entries 114_1, 114_2, 114_3, 114_4, . . . 114_n.

Concerning the packet linked list 110_1, one storage unit 116_1 stores a parameter Qhead to indicate a packet identifier of a head packet in the packet linked list 110_1 (i.e., a packet identifier of a packet having the highest dequeue priority in the packet linked list 110_1), and another storage unit 116_2 stores a parameter Qtail to indicate a packet identifier of a tail packet in the packet linked list 110_1 (i.e., a packet identifier of a packet having the lowest dequeue priority in the packet linked list 110_1). Similarly, concerning the packet linked list 110_2, one storage unit 118_1 stores a parameter Qhead to indicate a packet identifier of a head packet in the packet linked list 110_2 (i.e., a packet identifier of a packet having the highest dequeue priority in the packet linked list 110_2), and another storage unit 118_2 stores a parameter Qtail to indicate a packet identifier of a tail packet in the packet linked list 110_2 (i.e., a packet identifier of a packet having the lowest dequeue priority in the packet linked list 110_2). For example, the storage units 116_1, 116_2, 118_1, 118_2 may be implemented using flip-flops.

With regard to an enqueue process of a packet, the parameter Qhead is checked to see if the packet linked list 110_1/110_2 is empty, and the parameter Qtail is checked to know the packet identifier of the tail packet before the packet is enqueued. After the packet is enqueued, the parameters Qhead and Qtail are both updated if the enqueued packet is a new head packet (i.e., the packet linked list 110_1/110_2 leaves an empty state due to the enqueued packet), and only the parameter Qtail is updated if the enqueued packet is a new tail packet (i.e., the enqueued packet is linked to an original tail packet of a non-empty packet linked list 110_1/110_2). Since a person skilled in the art can readily understand details of the packet enqueue operation, further description is omitted here for brevity.

With regard to a dequeue process of a packet, the parameter Qhead is checked to know a packet identifier of a head packet (i.e., a packet identifier of the packet to be dequeued), and the parameter Qtail is checked to see if the packet to be dequeued is the last packet in the packet linked list 110_1/110_2. After the packet is dequeued, the parameters Qhead and Qtail are both updated if the dequeued packet is the last packet (i.e., the packet linked list 110_1/110_2 enters an empty state due to the dequeued packet), and only the parameter Qhead is updated if the dequeued packet is not the last packet (i.e., the packet linked list 110_1/110_2 is not empty after an original head packet of the packet linked list 110_1/110_2 is unlinked). Since a person skilled in the art can readily understand details of the packet dequeue operation, further description is omitted here for brevity.

As mentioned above, the sequence number counter 108 assigns sequence numbers SEQ_NUM to packets PKT based on an arrival sequence of the packets PKT (which is also the enqueue sequence of the packets PKT). In one exemplary design, the sequence number SEQ_NUM assigned to each packet is recorded in a linked list entry of the packet. As shown in FIG. 2, a packet coming from plane 0 is assigned with a packet identifier set by $PID_{11}$ and a sequence number SEQ_NUM set by '1'; the next packet coming from plane 1 is assigned with a packet identifier set by $PID_{21}$ and a sequence number SEQ_NUM set by '2'; the next packet coming from plane 1 is assigned with a packet identifier set by $PID_{22}$ and a sequence number SEQ_NUM set by '3'; the next packet coming from plane 1 is assigned with a packet identifier set by $PID_{23}$ and a sequence number SEQ_NUM set by '4'; the next packet coming from plane 0 is assigned with a packet identifier set by $PID_{12}$ and a sequence number SEQ_NUM set by '5'; the next packet coming from plane 0 is assigned with a packet identifier set by $PID_{13}$ and a sequence number SEQ_NUM set by '6'; the next packet coming from plane 0 is assigned with a packet identifier set by $PID_{14}$ and a sequence number SEQ_NUM set by '7'; and the next packet coming from plane 1 is assigned with a packet identifier set by $PID_{24}$ and a sequence number SEQ_NUM set by '8'.

A single packet is dequeued from the output queue 100 at a time. However, the proposed output queue 100 uses multiple packet linked lists 110_1 and 110_2, each having enqueued packets waiting to be forwarded to an egress port associated with the output queue 100. The second processing circuit 106 is equipped with the re-ordering capability, and is used to decide which of the packet linked lists 110_1 and 110_2 is granted to dequeue one packet therefrom. Specifically, the second processing circuit 106 is arranged to dequeue a packet from the output queue 100 by selecting a linked list entry from the packet linked lists 110_1 and 110_2 according to the packet selection information (e.g., sequence numbers) generated by the first processing circuit 102. Since each linked list entry has packet identification information (packet identifier) and dequeue priority information (sequence number) of a packet, the second processing circuit 106 can compare sequence numbers of all head packets available in the packet linked lists 110_1 and 110_2 to generate a comparison result, and refers to the comparison result to dequeue a head packet with a minimum sequence number from the output queue 100. As shown in FIG. 2, the head packet with packet identifier $PID_{11}$ in the packet linked list 110_1 has the sequence number SEQ_NUM set by '1', and the head packet with packet identifier $PID_{21}$ in the packet linked list 110_2 has the sequence number SEQ_NUM set by '2'. Hence, the head packet with packet identifier $PID_{11}$ will be dequeued from the output queue 100 due to having a minimum sequence number.

Based on the same packet selection rule mentioned above, the second processing circuit 106 will sequentially dequeue packet with packet identifier $PID_{21}$, packet with packet identifier $PID_{22}$ (which becomes a new head packet in packet linked list 110_2 after packet with packet identifier $PID_{21}$ is dequeued), packet with packet identifier $PID_{23}$ (which becomes a new head packet in packet linked list 110_2 after packet with packet identifier $PID_{22}$ is dequeued), packet with packet identifier $PID_{12}$ (which becomes a new head packet in packet linked list 110_1 after packet with packet identifier $PID_{11}$ is dequeued), packet with packet identifier $PID_{13}$ (which becomes a new head packet in packet linked list 110_1 after packet with packet identifier $PID_{12}$ is dequeued), packet with packet identifier $PID_{14}$ (which becomes a new head packet in packet linked list 110_1 after packet with packet identifier $PID_{13}$ is dequeued), and packet with packet identifier $PID_{24}$ (which becomes a new head packet in packet linked list 110_2 after packet with packet identifier $PID_{23}$ is dequeued).

The first processing circuit 202 generates packet selection information based on an arrival sequence of packets, where the packet selection information includes sequence numbers of the packets. In an alternative design, the packet selection information may be generated by a different manner. The same objective of informing the second processing circuit of the arrival/enqueue sequence of packets is achieved.

Figure 3:
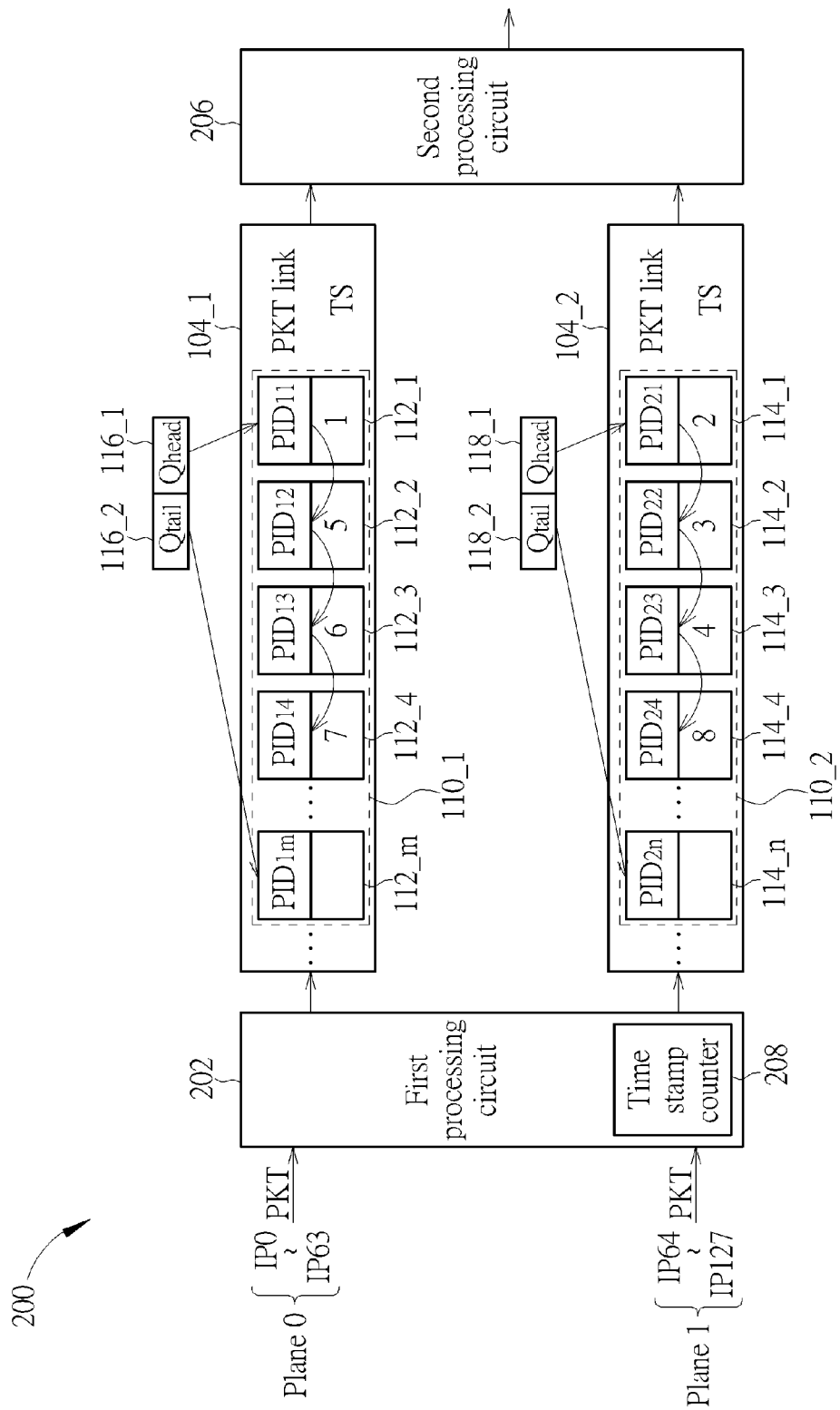
FIG. 3 is a diagram illustrating an output queue of a multi-plane network device according to a second embodiment of the present invention.

Please refer to FIG. 3, which is a diagram illustrating an output queue of a multi-plane network device according to a second embodiment of the present invention. The output queue 200 includes a first processing circuit 202, a second processing circuit 206, and the aforementioned storage devices 104_1, 104_2. Similarly, the first processing circuit 202 is arranged to generate packet selection information based on an arrival sequence of a plurality of packets PKT, each coming from one of a plurality of planes (e.g., plane 0 and plane 1) and required to be forwarded via the same output queue 200. The major difference between the first processing circuits 102 and 202 is that the first processing circuit 202 has a time stamp counter 208 configured to generate a time stamp TS for each of the packets PKT to be forwarded through the output queue 200. Hence, the packet selection information generated by the first processing circuit 202 would include time stamps of the packets.

In one exemplary design, the time stamp TS assigned to each packet is recorded in a linked list entry of the packet. Hence, as shown I FIG. 3, each of the linked list entries 112_1-112_m and 114_1-114_n now stores packet identification information (packet identifier) and dequeue priority information (time stamp) of an enqueued packet. Specifically, a packet coming from plane 0 is assigned with a packet identifier set by $PID_{11}$ and a time stamp TS set by '1'; the next packet coming from plane 1 is assigned with a packet identifier set by $PID_{21}$ and a time stamp TS set by '2'; the next packet coming from plane 1 is assigned with a packet identifier set by $PID_{22}$ and a time stamp TS set by '3'; the next packet from plane 1 is assigned with a packet identifier set by $PID_{23}$ and a time stamp TS set by '4'; the next packet coming from plane 0 is assigned with a packet identifier set by $PID_{12}$ and a time stamp TS set by '5'; the next packet coming from plane 0 is assigned with a packet identifier set by $PID_{13}$ and a time stamp TS set by '6'; the next packet coming from plane 0 is assigned with a packet identifier set by $PID_{14}$ and a time stamp TS set by '7'; and the next packet coming from plane 1 is assigned with a packet identifier set by $PID_{24}$ and a time stamp TS set by '8'.

Concerning the second processing circuit 206, it is used to decide which of the packet linked lists 110_1' and 1102' is granted to dequeue one packet therefrom. In this embodiment, the second processing circuit 206 is arranged to dequeue a packet from the output queue 200 by selecting a linked list entry from the packet linked lists 110_1' and 110_2' according to the packet selection information (e.g., time stamps) generated by the first processing circuit 202. Since each linked list entry has packet identification information (packet identifier) and dequeue priority information (time stamp) of a packet, the second processing circuit 206 can compare time stamps of all head packets available in the packet linked lists 110_1' and 110_2' to generate a comparison result, and refer to the comparison result to dequeue a head packet with a minimum time stamp from the output queue 200. As shown in FIG. 3, the head packet with packet identifier $PID_{11}$ in the packet linked list 110_1' has the time stamp TS set by '1', and the head packet with packet identifier $PID_{21}$ in the packet linked list 110_2' has the time stamp TS set by '2'. Hence, the head packet with packet identifier $PID_{11}$ will be dequeued from the output queue 200 due to having a minimum time stamp.

Based on the same packet selection rule mentioned above, the second processing circuit 206 will sequentially dequeue packet with packet identifier $PID_{21}$, packet with packet identifier $PID_{22}$ (which becomes a new head packet in packet linked list 110_2' after packet with packet identifier $PID_{21}$ is dequeued), packet with packet identifier $PID_{23}$ (which becomes a new head packet in packet linked list 110_2' after packet with packet identifier $PID_{22}$ is dequeued), packet with packet identifier $PID_{12}$ (which becomes a new head packet in packet linked list 110_1' after packet with packet identifier $PID_{11}$ is dequeued), packet with packet identifier $PID_{13}$ (which becomes a new head packet in packet linked list 110_1' after packet with packet identifier $PID_{12}$ is dequeued), packet with packet identifier $PID_{14}$ (which becomes a new head packet in packet linked list 110_1' after packet with packet identifier $PID_{13}$ is dequeued), and packet with packet identifier $PID_{24}$ (which becomes a new head packet in packet linked list 110_2' after packet with packet identifier $PID_{23}$ is dequeued).

Figure 4:
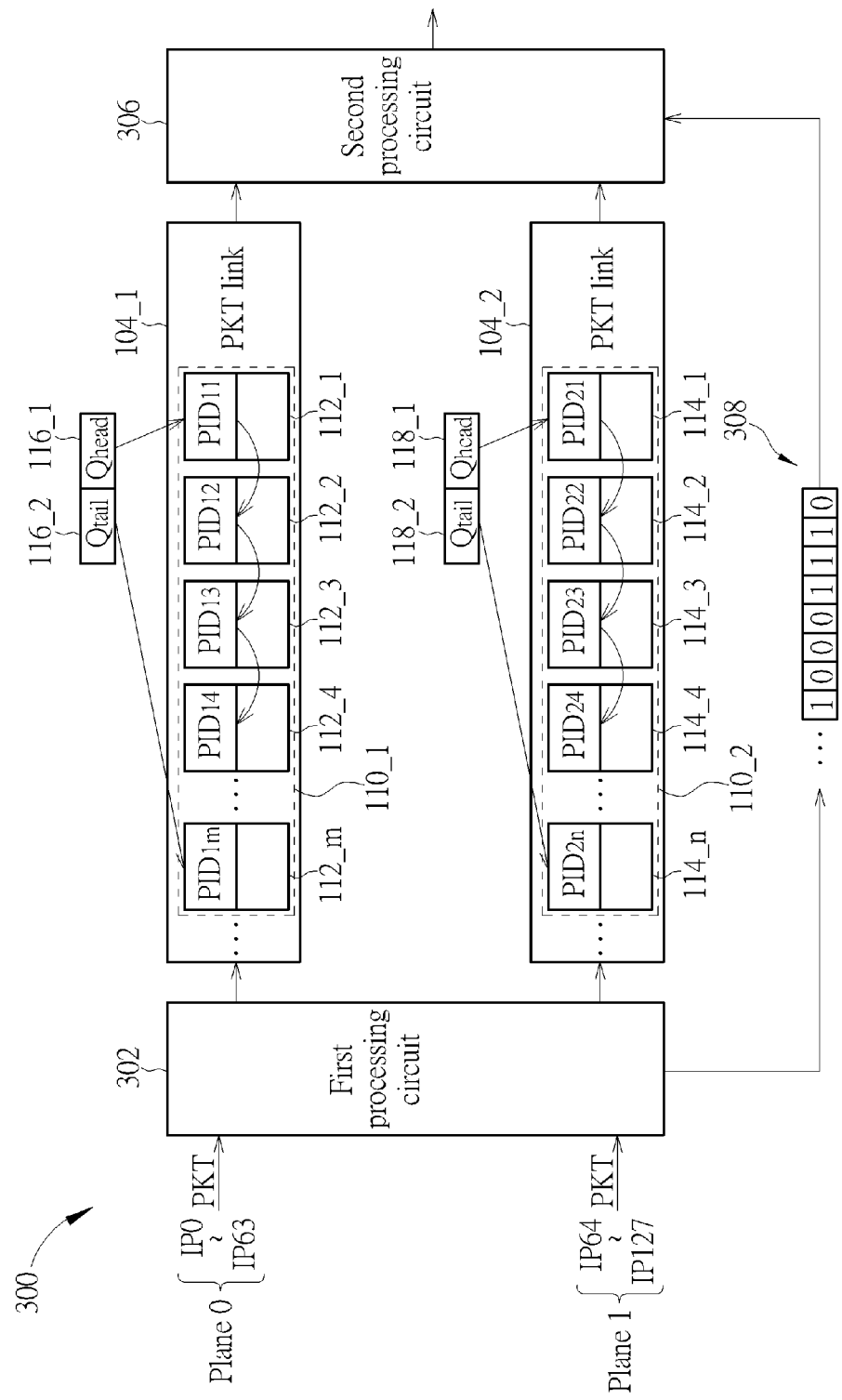
FIG. 4 is a diagram illustrating an output queue of a multi-plane network device according to a third embodiment of the present invention.

Please refer to FIG. 4, which is a diagram illustrating an output queue of a multi-plane network device according to a third embodiment of the present invention. The output queue 300 includes a first processing circuit 302, a second processing circuit 306, and the aforementioned storage devices 104_1, 104_2. Similarly, the first processing circuit 302 is arranged to generate packet selection information based on an arrival sequence of a plurality of packets PKT, each coming from one of a plurality of planes (e.g., plane 0 and plane 1) and required to be forwarded via the same output queue 300. The major difference between the first processing circuits 102 and 302 is that the first processing circuit 302 generates and outputs a sequence of packet linked list identifiers 308 that is indicative of an order of packet linked lists 110_1" and 110_2" to which the packets are enqueued. Hence, the packet selection information generated by the first processing circuit 302 would include the sequence of packet linked list identifiers 308. The sequence of packet linked list identifiers 308 is transmitted to the second processing circuit 306, and is not recorded in linked list entries 112_1-112_m, 114_1-114_n of the packet linked lists 110_1" and 110_2". By way of example, but not limitation, a binary value '0' is used to serve as a packet linked list identifier of the packet linked list 110_1", and another binary value '1' is used to serve as a packet linked list identifier of the packet linked list 110_2".

When ingress packets sequentially received and enqueued include a packet coming from plane 0 and assigned with a packet identifier set by $PID_{11}$, a packet coming from plane 1 and assigned with a packet identifier set by $PID_{21}$, a packet coming from plane 1 and assigned with a packet identifier set by $PID_{22}$, a packet coming from plane 1 and assigned with a packet identifier set by $PID_{23}$, a packet coming from plane 0 and assigned with a packet identifier set by $PID_{12}$, a packet coming from plane 0 and assigned with a packet identifier set by $PID_{13}$, a packet coming from plane 0 and assigned with a packet identifier set by $PID_{14}$, and a packet coming from plane 1 and assigned with a packet identifier set by $PID_{24}$. Therefore, the sequence of packet linked list identifiers 308 provided from the first processing circuit 302 to the second processing circuit 306 would be a bitstream 01110001.

Concerning the second processing circuit 306, it is used to decide which of the packet linked lists 110_1" and 110_2" is granted to dequeue one packet therefrom. In this embodiment, the second processing circuit 306 is arranged to dequeue a packet from the output queue 300 by selecting a linked list entry from the packet linked lists 110_1" and 110_2" according to the packet selection information (e.g., sequence of packet linked list identifiers 308) generated by the first processing circuit 302. Since the sequence of packet linked list identifiers 308 is created based the order of packet linked lists 110_1", 110_2" to which the packets are enqueued, the sequence of packet linked list identifiers 308 directly provides dequeue priority information used for sequentially selecting linked list entries from the packet linked lists 110_1", 110_2".

As shown in FIG. 4, the second processing circuit 306 refers to the sequence of packet linked list identifiers 308 to select the packet linked list 110_1" and then dequeue a head packet of the selected packet linked list 110_1" from the output queue 300. Based on the same packet selection rule mentioned above, the second processing circuit 306 will sequentially select packet linked list 110_2", packet linked list 110_2", packet linked list 110_2", packet linked list 110_1", packet linked list 110_1", packet linked list 110_1", and packet linked list 110_2". Hence, the second processing circuit 306 will sequentially dequeue packet with packet identifier $PID_{21}$, packet with packet identifier $PID_{22}$ (which becomes a new head packet in packet linked list 110_2" after packet with packet identifier $PID_{21}$ is dequeued), packet with packet identifier $PID_{23}$ (which becomes a new head packet in packet linked list 110_2" after packet with packet identifier $PID_{22}$ is dequeued), packet with packet identifier $PID_{12}$ (which becomes a new head packet in packet linked list 110_1" after packet with packet identifier $PID_{11}$ is dequeued), packet with packet identifier $PID_{13}$ (which becomes a new head packet in packet linked list 110_1" after packet with packet identifier $PID_{12}$ is dequeued), packet with packet identifier $PID_{14}$ (which becomes a new head packet in packet linked list 110_1" after packet with packet identifier $PID_{13}$ is dequeued), and packet with packet identifier $PID_{24}$ (which becomes a new head packet in packet linked list 110_2" after packet with packet identifier $PID_{23}$ is dequeued).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An output queue of a multi-plane network device, comprising:
    a first processing circuit, arranged to generate packet selection information based on an arrival sequence of a plurality of packets;
    a plurality of storage devices, arranged to store a plurality of packet linked lists for the output queue; and
    a second processing circuit, arranged to dequeue a packet from the output queue by selecting a linked list entry from the packet linked lists according to the packet selection information.

2. The output queue of claim 1, wherein each of the storage devices allows a single enqueue operation in one clock cycle only; or each of the storage devices is a 1R1W static random access memory (SRAM).

3. The output queue of claim 2, wherein each of the packets comes from one of a plurality of planes, and is required to be forwarded via the output queue; and the packet linked lists correspond to the planes, respectively, such that a packet coming from a specific plane of the planes and required to be forwarded via the output queue is enqueued into a packet linked list corresponding to the specific plane.

4. The output queue of claim 1, wherein the packet selection information includes sequence numbers of the packets, and the first processing circuit has a sequence number counter configured to generate a sequence number for each of the packets.

5. The output queue of claim 4, wherein the sequence number assigned to each packet is recorded in a linked list entry of the packet.

6. The output queue of claim 4, wherein the second processing circuit compares sequence numbers of all head packets available in the packet linked lists to generate a comparison result, and refers to the comparison result to dequeue a head packet with a minimum sequence number from the output queue.

7. The output queue of claim 1, wherein the packet selection information includes time stamps of the packets, and the first processing circuit has a time stamp counter configured to generate a time stamp for each of the packets.

8. The output queue of claim 7, wherein the time stamp assigned to each packet is recorded in a linked list entry of the packet.

9. The output queue of claim 7, wherein the second processing circuit compares time stamps of all head packets available in the packet linked lists to generate a comparison result, and refers to the comparison result to dequeue a head packet with a minimum time stamp from the output queue.

10. The output queue of claim 1, wherein the packet selection information includes a sequence of packet linked list identifiers indicative of an order of packet linked lists to which the packets are enqueued.

11. A method for managing an output queue of a multi-plane network device, comprising:
generating packet selection information based on an arrival sequence of a plurality of packets;
utilizing a plurality of storage devices to store a plurality of packet linked lists for the output queue; and
dequeuing a packet from the output queue by selecting a linked list entry from the packet linked lists according to the packet selection information.

12. The method of claim 11, wherein each of the storage devices allows a single enqueue operation in one clock cycle only; or each of the storage devices is a 1R1W static random access memory (SRAM).

13. The method of claim 12, wherein each of the packets comes from one of a plurality of planes, and is required to be forwarded via the output queue; and the packet linked lists correspond to the planes, respectively, such that a packet coming from a specific plane of the planes and required to be forwarded via the output queue is enqueued into a packet linked list corresponding to the specific plane.

14. The method of claim 11, wherein the packet selection information includes sequence numbers of the packets.

15. The method of claim 14, further comprising:
recording the sequence number assigned to each packet in a linked list entry of the packet.

16. The method of claim 14, wherein the step of dequeuing the packet from the output queue comprises:
comparing sequence numbers of all head packets available in the packet linked lists to generate a comparison result; and
referring to the comparison result to dequeue a head packet with a minimum sequence number from the output queue.

17. The method of claim 11, wherein the packet selection information includes time stamps of the packets.

18. The method of claim 17, further comprising:
recording the time stamp assigned to each packet in a linked list entry of the packet.

19. The method of claim 17, wherein the step of dequeuing the packet from the output queue comprises:
comparing time stamps of all head packets available in the packet linked lists to generate a comparison result; and
referring to the comparison result to dequeue a head packet with a minimum time stamp from the output queue.

20. The method of claim 11, wherein the packet selection information includes a sequence of packet linked list identifiers indicative of an order of packet linked lists to which the packets are enqueued.

* * * * *